Patented Aug. 27, 1946

2,406,423

UNITED STATES PATENT OFFICE 2,406,423

ORGANIC PHOSPHORUS AND NITROGEN CONTAINING COMPOUNDS

Willard H. Woodstock, Flossmoor, Ill., assignor to Victor Chemical Works, a corporation of Illinois No Drawing. Application April 20, 1944, Serial No. 531,999

13 Claims. (Cl. 260—461)

This invention relates to organic phosphorus and nitrogen containing compounds and more particularly to compounds of the type formula:

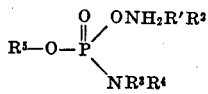

in which each of the R's represents an alkyl or aryl group, or in the case of R', $R^2$ and $R^4$ may represent hydrogen or its equivalent, and in which either $R^3$ or $R^5$ contains a straight chain aliphatic group or its equivalent.

Products produced by the method herein described and having the formula above given are of particular value as surface active agents. In the preferred form $R^3$ contains an alkyl group of 8 or more carbon atoms. Compounds of this type have strong wetting out properties and are cation active, when $R^5$ is a short chain alkyl group of less than 5 carbon atoms. The aqueous solutions of such materials possess the property of substantially completely discharging on cotton, silk and paper fibres.

This application is a continuation-in-part of my copending application Serial No. 417,412, filed October 31, 1941.

The products are preferably prepared by reacting neutral esters of metaphosphoric acid with ammonia or amines in accordance with the formulae:

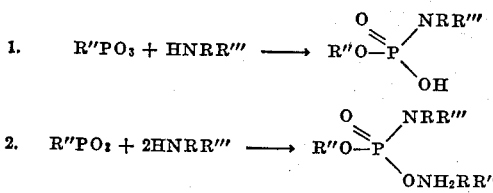

Either anhydrous ammonia or organic primary or secondary amines may be employed. In the preferred case, however, two molecular equivalents of the nitrogen bearing material are employed with one molecular equivalent of the metaphosphoric acid ester. It is not necessary to use the same nitrogen bearing compound in each of the above formulae. The product produced may be a mixed composition as, for example, by using ammonia for the primary reaction and an amine for the second or vice versa.

As a typical example of my procedure, two mole equivalents of a long chain aliphatic amine are melted in a reaction vessel and vigorously stirred while slowly adding one mole equivalent of a neutral organic metaphosphate ester. The heat of reaction is removed by external cooling, but not sufficiently so to cause the reaction mass to solidify. After the metaphosphate ester is completely added the mixture is agitated for a period of about one hour or sufficiently long for completion of the reaction and the product then allowed to cool to room temperature. As an alternate procedure it is sometimes desirable to carry out the reaction in an inert liquid solvent medium such as carbon tetrachloride or toluene. In this case the solvent is evaporated off after the reaction is completed.

As a specific example, one mole of ethyl metaphosphate was reacted with two moles of commercial lauryl amine in the manner described above. This commercial material contained about 90% of the mono amine. It was melted and held at a temperature of about 50 to 60° C., while adding the mole equivalent of ethyl metaphosphate. This was chosen as the amount required to form a product having a pH of 6.5 to 7.0 in 0.5% aqueous dispersion. The product in this case was the lauryl amine salt of the lauryl amide of ethyl orthophosphoric acid. It was a slightly colored oily liquid which solidified at a temperature slightly above normal room temperature.

When solid the product was tan-colored and of butter-like consistency. It had an ammonical odor and a melting range of about 45 to 50° C. Its specific gravity at 55° C. was 0.91. It had a Draves sinking time of 19.4 seconds at 0.4% concentration.

In a similar manner a stearyl amine salt of the stearyl amide of ethyl orthophosphoric acid was produced. This product was a tan colored solid of butter-like consistency with a melting point of 50 to 60° C.

In a jacketed kettle of suitable size equipped with a stirrer and temperature indicator, 427 parts by weight of a commercial stearyl amine (86–92% amine) is melted at 55 to 60° C. and 74 parts of ethyl metaphosphate (65.8% $P_2O_5$ content) slowly added at such rate that the heat of reaction does not raise the temperature above 80° C. This takes about 5 hours and the charge is held at 70 to 80° C. for three hours longer to allow reaction to be completed. The molten product is then poured into trays and allowed to cool and solidify. The product is a tan-colored butter-like solid, having an ammonical odor with a melting range of about 50 to 60° C. In 0.5% aqueous dispersion, it has a pH value between 6.7 and 7.2. It has a specific gravity of 0.89 at 55° C. and a Draves sinking time of 30 seconds at 1.0% concentration.

The above lauryl and stearyl compositions have characteristics which are quite similar in that they are both soluble in most organic solvents such as benzene, alcohol, ether, mineral oil, carbon tetrachloride, lubricating oil, butyl acetate, linseed oil, etc. Both disperse in water giving opaque to gel-like solutions. A 5% aqueous solution of the stearyl compound and a 10% solution of the lauryl compound are gelatinous starch-like pastes of equal consistency.

Both compounds are cation-active, their aqueous solutions possessing the property of completely discharging on cotton, silk and paper fibres. For example, cotton skeins when immersed in a 0.4% solution of these compounds, then washed with distilled water and dried, showed adsorption equivalent to 3.8% and 2.4% respectively for the lauryl and stearyl compounds based on the weight of the cotton. Both compounds possess wetting out properties and are strong emulsifying agents. For example, eight grams of each product in 100 cc. of water were agitated with 100 cc. of mineral oil to produce thick creamy stable emulsions of the water-in-oil type.

In the two examples above given, the alkyl groups in the salt and amide positions of the molecule were the same, but products may be made in which the groups are unlike by carrying out the reaction in two stages employing different organic amines for the two stages of the reaction. For example, one mole of ethyl metaphosphate may be reacted with one mole of lauryl amine, and this reaction product further reacted with one mole of a different organic amine. A compound of this type was prepared by reacting one mole of ethyl metaphosphate with one mole of lauryl amine and subsequently reacting with one mole of ethylene diamine. The product was a clear oil of alkaline reaction. It would not disperse in water. When treated with concentrated hydrochloric acid a crystalline hydrochloride of the compound was formed which was dispersible in water giving a foaming solution. It discharged on cotton and exhibited other cationic active properties.

In another example, lauryl amine is reacted with ethyl metaphosphate, and the resulting product reacted with one mole of stearyl amine to produce a product having good wetting and excellent cationic active properties.

This experiment may be carried out as follows:

In a one-liter 3-necked flask equipped with cooling bath, stirrer, and thermometer, 108 g. ethyl metaphosphate was slowly added to 185 g. commercial lauryl amine at 50 to 55° C. with some cooling, and the product then heated at 80° C. for 1 hour. This product was then cooled to 55 to 60° C., 268 g. molten commercial stearyl amine added, and the charge heated to 80° C. for 2 hours. After pouring and cooling the product was a tan-colored semi-liquid having an ammonical odor, and a melting range from 30 to 35° C. It had a specific gravity of 0.918 at 65° C., and a pH value of 6.25 in 0.5% aqueous dispersion, a Draves sinking time of 12 seconds at 0.5% concentration, and analysis showed it to contain 13.5% $P_2O_5$. It was soluble in methanol, ether, kerosene, toluene, and similar solvents, and was dispersible in water with strong cation-active character.

In another example one mole of octyl metaphosphate was reacted with two moles of anhydrous ammonia in a toluol reaction medium. After completion of the reaction the toluol was evaporated off. The product was a light yellow, friable, non-crystalline solid. It was soluble in water with foaming. It was a wetting agent and was inert towards calcium and other salts in hard waters.

In another example where octyl metaphosphate was reacted with ethylene diamine, the product was yellow and butter-like. It did not foam in water and was much more soluble in organic solvents than in water.

Two moles of octyl amine were reacted with ethyl metaphosphate to give an amber colored oil which foamed in water, but was not a good emulsifying agent. It was only partially soluble in oils.

The lauryl amine salt of the lauryl amide of methyl orthophosphoric acid prepared by reacting two moles of the amine with methyl metaphosphate was found to be an excellent wetting and cationic active agent.

This may be prepared as follows:

In a one-liter flask equipped with a bath, stirrer, and thermometer, 600 g. commercial lauryl amine (92% amine) is heated to 50° C. and 141 g. methyl metaphosphate slowly added while maintaining the temperature at 50 to 70° C. with cooling bath. The charge was then held at 80° C. for 2 hours to complete the reaction. The charge was poured and allowed to solidify forming a tan-colored, butter-like solid, having an ammonical odor, and a melting range near 45° C. Its specific gravity at 75° C. was 0.935, and the Draves sinking time was 16 seconds at 0.5% concentration. It has a pH value range of 6.7 to 7.2 in 0.5% aqueous dispersion. In aqueous dispersion it has strong cationic activity. It is soluble in methanol, ether, kerosene, toluene, etc.

A particularly desirable amine from the standpoint of economic availability is cocoa amine which contains a mixture of various amines ranging from 8 to 18 carbon atoms. The reaction product of one mole of methyl metaphosphate and two moles of the cocoa amine had wetting out properties and was cation active. It may be prepared as follows:

In a two-liter flask equipped with stirrer, thermometer, and cooling bath, 187 g. methyl metaphosphate is slowly added to 671 g. commercial coco-amine at a temperature not greater than 70° C. After stirring 3 hours at 70 to 75° C. the charge is poured and allowed to cool. The product is a tan-colored semi-liquid having a melting range between 25 and 50° C. and an ammonical odor. It is a good wetting agent, and is strongly cation-active. It has a specific gravity of 0.927 at 55° C., a pH of 6.5 in 0.5% aqueous dispersion, and is soluble in methanol, ether, kerosene, toluene, and similar solvents.

Long chain amines in the salt position increase the stability and dispersibility of the product in water. They also increase the organic nature and oil solubility of the product. Alkyl groups of more than 3 carbon atoms in length in the ester position appear to decrease the water solubility.

All of the compounds the preparation of which have been specifically described herein are stable against thermal decomposition at temperatures up to at least 175° C.

It is not essential that the esters and amines employed in our process be pure homogeneous compounds, for example, the neutral metaphosphate esters may be mixtures of several alkyl or aryl groups. The amines may contain mixed alkyl, alkaryl, or aryl groups; however, it is essential that little if any aryl groups be present in the amide forming step of the process if wetting and cationic properties are desired. Alkaryl amines may be suitable for producing cationic active compounds where the straight chain group has sufficient length preferably at least 8 carbon atoms in length. Aryl amide compositions, however, may be produced by the reaction if desired. Such compounds may be useful as plasticizers or oil treating agents.

The new surface active compounds of this invention are compatible with other similar surface active compounds and may be used in compositions containing such compounds. For example, the cation active products may be mixed with other cation active products to give a surface active composition having the specific characteristic advantages of each type of component.

In determining the number of carbon atoms in any particular chain compound the usual rules of equivalents apply.

The Draves sinking time referred to herein, is a test carried out in accordance with the "Draves" method described in American Assoc. Textile Chem. Colorists Year-Book, p. 162 (1935–6). The test comprises the determination of the time required for a 5.0 g. skein of two-ply unboiled cotton yarn to sink when weighted with a 1.5 gram sinker and submerged in the wetting agent solution by means of an anchor.

The foregoing detailed description has been given for clearness of understanding only, and no unnecessary limitations should be understood therefrom.

What I claim as new, and desire to secure by Letters Patent is:

1. A surface active composition consisting essentially of a compound of the formula:

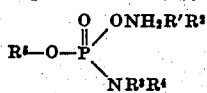

in which R', R² and R⁴ represent a radical of the class consisting of hydrogen and an alkyl group, R³ represents an alkyl group of at least 8 carbon atoms chain length, and R⁵ represents an alkyl group of 1 to 4 carbon atoms chain length.

2. A compound as set forth in claim 1, in which R⁴ is hydrogen.

3. A compound as set forth in claim 1, in which R⁴ and R' are hydrogen, and R² is an alkyl group.

4. A compound as set forth in claim 1, in which R² and R³ are stearyl radicals.

5. A compound as set forth in claim 1, in which R² and R³ represent stearyl radicals, R' and R⁴ represent hydrogen, and R⁵ represents an alkyl group of 1 to 4 carbon atoms.

6. A compound as set forth in claim 1, in which R⁵ represents an ethyl radical.

7. The long chain aliphatic amine salt of a long chain aliphatic amide of a short chain alkyl ester of orthophosphoric acid obtained by reacting one mole proportion of a neutral alkyl ester of metaphosphoric acid in which the alkyl group contains from 1 to 4 carbon atoms with one mole proportion of each of two aliphatic amines in which at least one of the amines has an aliphatic radical containing a straight chain of at least 8 carbon atoms.

8. A compound as set forth in claim 7, in which the metaphosphate is ethyl metaphosphate, and in which an amine is lauryl amine.

9. A compound as set forth in claim 7, in which the metaphosphate is ethyl metaphosphate, and in which an amine is stearyl amine.

10. A salt as set forth in claim 7, in which at least one of the reacting amines is primary.

11. A surface active composition consisting essentially of a monostearyl amine salt of the monostearyl amide of ethyl phosphoric acid.

12. A surface active composition consisting essentially of a monolauryl amine salt of the monolauryl amide of ethyl phosphoric acid.

13. A surface active composition consisting essentially of a monostearyl amine salt of the monostearyl amide of methyl phosphoric acid.

WILLARD H. WOODSTOCK.